United States Patent
Scheel et al.

(10) Patent No.: US 6,351,401 B1
(45) Date of Patent: Feb. 26, 2002

(54) SERIES RESONANT CONVERTER COMPRISING A CONTROL CIRCUIT

(75) Inventors: Thomas Scheel, Aachen; Christian Hattrup, Herzogenrath; Olaf Märtens, Hamburg, all of (DE)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/644,152

(22) Filed: Aug. 23, 2000

(30) Foreign Application Priority Data

Aug. 24, 1999 (DE) .......................... 199 40 137

(51) Int. Cl.⁷ .................. H02M 3/24; H02M 5/42; H02M 7/44
(52) U.S. Cl. .................. 363/98; 363/58; 323/901
(58) Field of Search .................. 363/98, 41, 95, 363/40, 58, 55; 323/901

(56) References Cited

U.S. PATENT DOCUMENTS

| | | | |
|---|---|---|---|
| 4,060,752 A | * 11/1977 | Walker | 315/244 |
| 4,071,812 A | * 1/1978 | Walker | 363/80 |
| 5,107,412 A | 4/1992 | Fuchs | 363/96 |
| 5,504,668 A | 4/1996 | Beyerlein et al. | 363/95 |
| 5,731,968 A | * 3/1998 | Van Der Broeck et al. | 363/71 |
| 5,774,351 A | * 6/1998 | Hsieh et al. | 363/132 |
| 6,072,856 A | * 6/2000 | Van Der Broeck et al. | 363/98 |

FOREIGN PATENT DOCUMENTS

GB 2039438 A * 8/1980 ............ H03B/5/12

OTHER PUBLICATIONS

O. Follinger, "Lineare Abastsysteme", R. Oldenburg Verlag, 1982, Chapter 7.6.

* cited by examiner

Primary Examiner—Bao Q. Vu
(74) Attorney, Agent, or Firm—John F. Vodopia

(57) ABSTRACT

The invention relates to a series resonant converter (1) comprising a control circuit (8) for controlling the output voltage of the converter.

To improve the behavior of the converter, it is proposed that the control circuit (8) is provided for processing a first actual value ($U_{out}$), which depends on the respective converter output voltage ($u_{out}(t)$) and for processing a second actual value ($U_C$), which depends on the respective current ($i_{res}(t)$) flowing through the series resonant circuit elements (C, L, R) of the converter (1), and that the control circuit (8) is provided for delivering a correcting variable (u) determining the scanning ratio of a pulse-width modulated voltage ($u_{pwm}(t)$) delivered to the series resonant circuit of the converter.

10 Claims, 2 Drawing Sheets

SERIES RESONANT CONVERTER COMPRISING A CONTROL CIRCUIT

BACKGROUND OF THE INVENTION

The invention relates to a series resonant converter comprising a control circuit for controlling the output voltage of the converter.

Such converters are used, for example, in high-voltage generators for X-ray apparatus.

In such converters is usually included a control circuit for controlling the output voltage, to keep them at a constant value in a steady state condition. However, basically the starting behavior of the converter is problematic. For example, a briefest possible rise time and a smallest possible overshoot at the end of the starting phase is desirable for rapidly reaching the steady state condition of the converter. When used in X-ray apparatus, reaching the steady state condition in the fastest possible way is to be strived for so as to avoid detrimental undesired radiation doses for the respective patients.

From U.S. Pat. No. 5,107,412 is known a series resonant converter which is used in high-voltage generators for X-ray apparatus and by which the desired starting behavior is not yet reached. The converter includes a full-wave bridge comprising thyristors. A current detector is provided for detecting zero crossings of the current flowing through the resonant circuit elements and delivered by the full-wave bridge. An ignition pulse generator generates ignition pulses for igniting the thyristors in dependence on the zero crossings detected by the current detector. The thyristors are then controlled such that a thyristor is not ignited until the current flowing through another thyristor conducting until then has dropped to zero and, furthermore, the so-called recovery time has elapsed. A zero crossing signal is not generated until the respective current in reverse direction has dropped below a threshold value ($i_s$), that is, has exceeded this value. To ensure that the converter also works with very small currents in the reverse direction of the thyristors, thus when such a threshold value is not reached, there is proposed to generate an auxiliary zero crossing signal when no zero crossing signal occurring in normal operation is generated within a specific period of time after an ignition pulse. Furthermore, the described series resonant converter includes a controller for controlling the converter output voltage, which controller compares the actual value of the high voltage delivered by the converter to a reference value (nominal value) and delivers controller output signal in a manner not further explained, whose magnitude is determined by the difference between the actual high voltage produced by the converter and the reference value.

SUMMARY OF THE INVENTION

It is an object of the invention to provide a series resonant converter having an improved starting behavior.

The object is achieved in that the control circuit is provided for processing a first actual value, which depends on the respective converter output voltage, and for processing a second actual value, which depends on the respective current flowing through the series resonant circuit elements of the converter, and in that the control circuit is provided for delivering a correcting variable determining the scanning ratio of a pulse-width modulated voltage delivered to the series resonant circuit of the converter.

The converter according to the invention helps to achieve, via an additionally processed second actual value, a dynamic behavior in the starting phase of the converter, which behavior is improved compared to conventional converters—more particularly a shorter rise time, a reduced peak overshoot, a shorter settling time and a larger robustness against tolerances of converter elements. Conventional series resonant converters only have controllers in which the difference is formed between the actual value of the output voltage and a nominal value of the output voltage. A normally used analog controller—customarily an analog PI controller—is used for forming a correcting variable in dependence on this difference.

In an embodiment of the invention, a digital control circuit includes a state space control. This enables to adapt the converter control circuit to modified frame conditions with little expenditure, which may be effected via software modifications when a digital signal processor is used.

The second actual value preferably represents scanning values of the current at its peaks flowing through the series resonant circuit elements of the converter. More particularly, an integration is provided of the current flowing through the series resonant circuit elements of the converter so as to form from the values thus determined the scanning values used for forming the second actual value.

In the fundamental embodiment for the digital control circuit there is provided that for forming the correcting variable both a first product of a factor and the first actual value and a second product of a second factor and the second actual value are subtracted from a value derived from the difference between the first actual value and a nominal value that represents the DC output voltage to be delivered.

In a variant of an embodiment of the digital control circuit there is provided that for forming the correcting variable a cascaded controller structure is provided, more particularly in that in an outer control loop both a first product of a factor and the first actual value and a second product of a second factor and the second actual value are subtracted from a value derived from the difference between the first actual value and a nominal value that represents the DC output voltage to be delivered, in an inner control loop, after the difference value produced by the outer control loop has been processed according to a limiting function, both a third product of a third factor and the first actual value and a fourth product of a fourth factor and the second actual value are subtracted from the value processed according to the limiting function.

By means of the additional inner control loop, a limitation of the current flowing through the resonant circuit elements of the converter is achieved.

For the case where there is a small load present on the converter output there is proposed to convert the second actual value in the outer control loop according to a non-linear function into a value that is used instead of the second product, because for this case the converter controller can no longer be adequately converted with an embodiment based on purely linear controller structures. More particularly, for most applications it is sufficient to use as a non-linear function a partially linear function in which for the case of normal operation with small loads, also a simple proportionality factor is used as an approximation—but which has a different value.

In a further embodiment of the invention the difference between the first actual value and a nominal value representing the DC output voltage to be delivered is summed while the sum values thus formed are weighted with a further factor. In this way stationary control deviations are counteracted.

BRIEF DESCRIPTION OF THE DRAWINGS

Examples of embodiment of the invention will be further explained with reference to the drawings in which.

DESCRIPTION OF THE PREFERRED EMBODIMENTS

Figure 1:
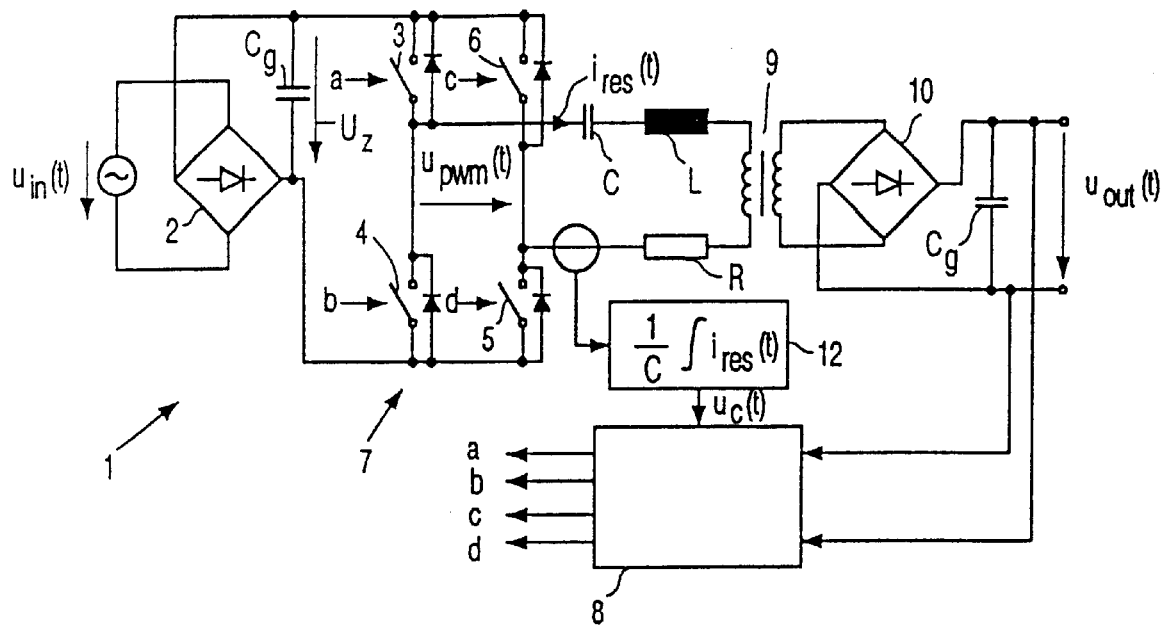
FIG. 1 shows the basic structure of a converter according to the invention.

The series resonant converter 1 shown in FIG. 1 is supplied on the input side with an input voltage $u_{in}(t)$—normally an AC mains voltage. This voltage is applied to a rectifier arrangement 2. The rectified voltage coming from the rectifier arrangement 2 is smoothed by means of a smoothing capacitor $C_g$. The smoothed voltage $U_Z$ present on the capacitor $C_g$ is applied to a full-wave bridge circuit 7 comprising four circuit elements 3, 4, 5 and 6, which bridge circuit generates a pulse-width modulated voltage $u_{pwm}(t)$ by suitably driving the circuit elements 3 to 6 via control signals a, b, c and d produced by a control circuit 8. Normally, a freewheeling diode is connected in parallel to each of the switches. By means of the control signals a, b, c and d the control circuit 8 defines the scanning ratio of the pulse-width modulated voltage $u_{pwm}(t)$ as a correcting variable. This voltage $u_{pwm}(t)$ is applied to a series resonant circuit which includes a capacitor C, an inductor L and a resistor R as series-arranged resonant circuit elements. The inductor L is in the present case not a separate component, but the primary side stray inductance of a transformer 9 through whose primary winding the current $i_{res}(t)$ flows through the series resonant circuit elements C, L and R. The resistor R represents the total ohmic losses of the resonant circuit. The stepped-up voltage present on the secondary side of the transformer 9 is applied to a further rectifier arrangement 10. This further rectifier arrangement 10 is connected by its output to a smoothing capacitor $C_g$ from which the converter output voltage $u_{out}(t)$ can be tapped. This voltage may be used, for example, as a high voltage for X-ray tubes.

The control circuit 8, which is embodied here as a digital control circuit, processes two measuring variables to actual values. On the one hand, the output voltage $u_{out}(t)$ is measured and on the other hand also the current $i_{res}(t)$. A derived voltage signal, which is the voltage $u_C(t)$ on the capacitor C and applied to the control circuit 8, is formed from the current $i_{res}(t)$ via integration (circuit block 12). For this purpose it is also possible to use a non-ideal integrator—for example, a low-pass filter. The control circuit 8 is preferably realized by a digital signal processor, with the scanning frequency used here corresponding to twice the frequency at which the voltage $u_{pwm}(t)$ is pulse-width modulated. However, other scanning frequencies may be used too, for example, the pulse-width modulating frequency itself, half its value, or also ⅔ of this frequency value.

Figure 2:
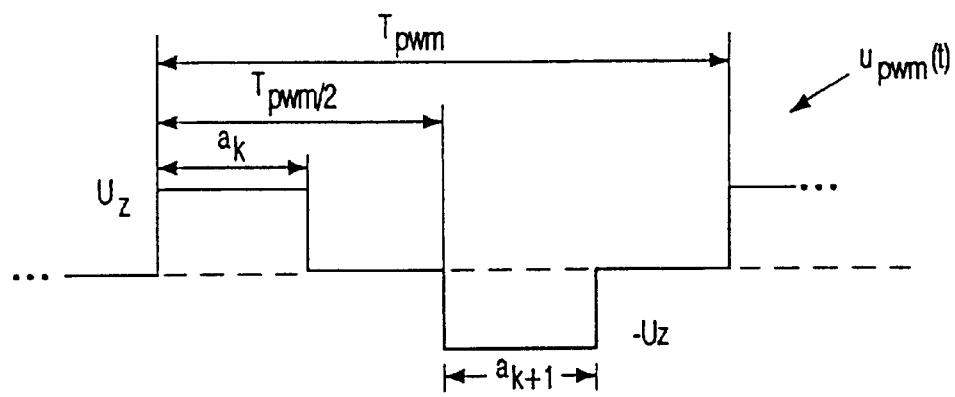
FIG. 2 shows the pattern of a pulse-width modulated voltage applied to the series resonant circuit elements of the converter.

FIG. 2 shows the basic pattern of the pulse-width modulated voltage $u_{pwm}(t)$. The fixed period duration of the pulse-width modulation is referenced $T_{pwm}$. When a fixed period duration $T_{pwm}$ is selected, also the switching frequency $f_{pwm}=1/T_{pwm}$ is constant, the value of which is set to the resonant frequency that results from the inductance L and the capacitance C. The current $i_{res}(t)$ thus produced is accordingly substantially sinusoidal for large load currents and is in phase with the pulse-width modulated voltage $u_{pwm}(t)$. In the first half of the period shown, there is a square-wave pulse having length $a_k$ and positive height $U_z$, which pulse is assigned to a scanning instant k (see FIG. 3). For the rest of the first half of the period the voltage $u_{pwm}(t)$ is equal to zero. In the second half of the period $T_{pwm}$ shown lies a square-wave pulse of length $a_{k+1}$ and negative height $-U_z$ assigned to a scanning instant k+1. For the rest of the second half of the period the voltage $u_{pwm}(t)$ is equal to zero. The respective current scanning ratio of the pulse-width modulated voltage $u_{pwm}(t)$ is unambiguously determined by the respective values of $a_k$, $a_{k+1}$, ... and the period duration $T_{pwm}$.

Figure 3:
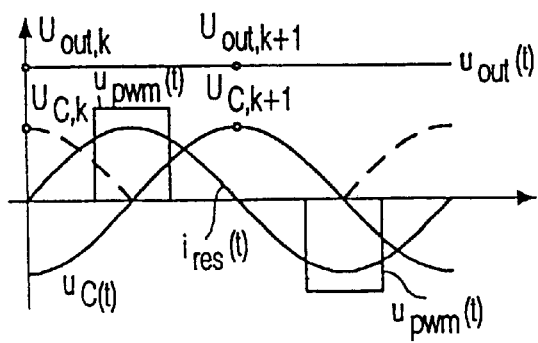
FIG. 3 shows a diagram for explaining the actual values for a control circuit of the converter.

FIG. 3 shows idealized waveforms of the pulse-width modulated voltage $u_{pwm}(t)$, of the output voltage $u_{out}(t)$, of the current $i_{res}(t)$ and of the voltage $u_C(t)$. For forming actual values for the control circuit 8, on the one hand the output voltage $u_{out}(t)$ is scanned at instants k, k+1, k+2, ... and scanning values $U_{out,k}$, $U_{out,k+1}$, $U_{out,k+2}$, ... are obtained. On the other hand, also the voltage $u_C(t)$ is scanned at the instants k, k+1, k+2, ...; from these scanning values is formed the value for obtaining scanning values $U_{c,k}$, $U_{c,k+1}$, $U_{c,k+2}$, .... The scanning instants are selected so that they always lie in a maximum or minimum of $u_C(t)$, so that the respective current amplitude values of the voltage $u_C(t)$, dropping at the capacitor C occur as scanning values $U_{c,k}$, $U_{c,k+1}$, $U_{c,k+2}$, ....

Figure 4:
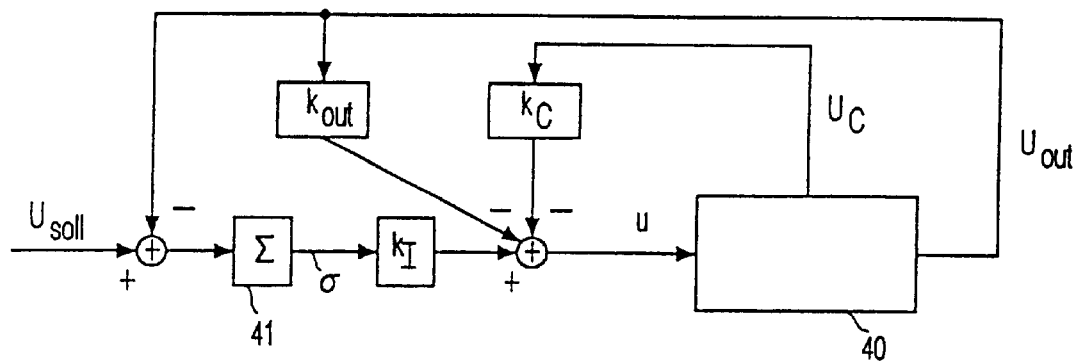
FIG. 4 shows an embodiment of the converter control circuit.

The mode of operation of a variant of embodiment for the control circuit 8 is shown in FIG. 4. A block 40 represents the control path, which generates the actual values $U_{out}$ and $U_C$ in dependence on a correcting variable applied thereto. The actual values and the correcting variable are available as digital values for various scanning instants k, k+1, k+2, .... The time index k, however, is omitted for clarity for all the time-dependent variables shown in FIG. 4.

The correcting variable u is formed in the following fashion: First the actual value $U_{out}$ is subtracted from a predefined nominal value $U_{soll}$. The difference values resulting therefrom are summed (block 41)—in accordance with an integration with analog controllers—and the sum σ is multiplied by a factor $k_I$. From the thus formed value are subtracted a first product of the first actual value $U_{out}$ and a factor $k_{out}$ and a second product of the second actual value $U_C$ and a factor $k_C$ to form the correcting variable u. The summation block 41 and the associated factor $k_I$ are used for eliminating stationary control deviations.

In the following the model will be explained which is used as a basis for determining the parameters of a discrete-time control realized by means of the control circuit 8. $U_{out}$ and $U_C$ are considered scanned states which are recursively formed according to the formula $$\begin{pmatrix} U_{out} \\ U_C \end{pmatrix}_{k+1} = A \begin{pmatrix} U_{out} \\ U_C \end{pmatrix}_k + bu(a_k)$$

A and b represent system matrices which result from the converter parameters.

A value $t_A$ represents the scanning time of the digital controller, which time is equal to half the period duration $T_{pwm}$ of the pulse width modulation (see FIG. 2).

Furthermore, the correcting variable u is determined for the scanning instant k by a non-linear (sine) function, which denotes the connection with the time duration $a_k$ (see FIG. 2) which, owing to the fixed period duration $T_{pwm}$ of the pulse-width modulation, directly indicates a measure for the scanning ratio of the pulse-width modulation with respect to the scanning instant k:

$$\mu(\alpha_k) = \sin(\pi\alpha_k)$$

The respective values $a_k$ are determined from the correcting variable u while using this formula.

This model is extended in that also the parameters σ and $k_I$ are taken into consideration. σ is used as an additional state of the model. This leads to an extended equation system:

$$\begin{pmatrix} U_{out} \\ U_C \\ \sigma \end{pmatrix}_{k+1} = \begin{pmatrix} A & \begin{matrix} 0 \\ 0 \end{matrix} \\ \hline -1\ 0 & 1 \end{pmatrix} \begin{pmatrix} U_{out} \\ U_C \\ \sigma \end{pmatrix}_k + \begin{pmatrix} b \\ 0 \end{pmatrix} u + \begin{pmatrix} 0 \\ 0 \\ 1 \end{pmatrix} U_{soll}$$

with $$u = -(k_{out}\ \ k_C\ \ -k_I)^T \begin{pmatrix} U_{out} \\ U_C \\ \sigma \end{pmatrix}$$

The parameters $k_{out}$, $k_C$ and $k_I$, can be determined according to the so-termed pole placement method—that is, according to a design by predefined eigenvalue or pole—(see, for example, O. Föllinger, "Lineare Abtastsysteme", R. Oldenburg Verlag, 1982, chapter 7.6), which assumes that in preceding steps first the desired dynamic properties of the system, such as rise time, peak overshoot and settling time, are predefined and corresponding eigenvalues of the system matrix A are determined from these predefined values. When an overshoot of the system is to be avoided completely—which is regularly to be strived for—this requires purely real eigenvalues without an imaginary portion.

Figure 5:
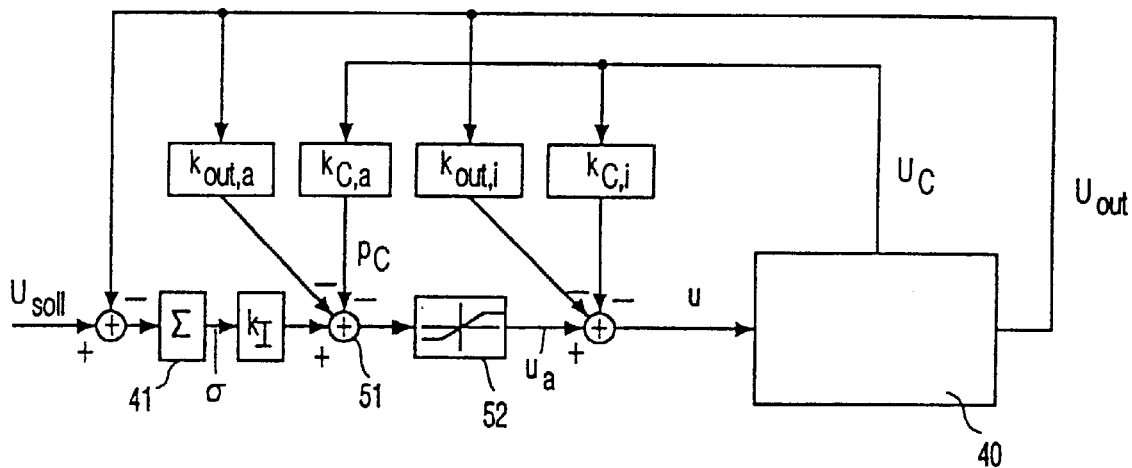
FIG. 5 shows a further embodiment of the converter control circuit.
Figure 6:
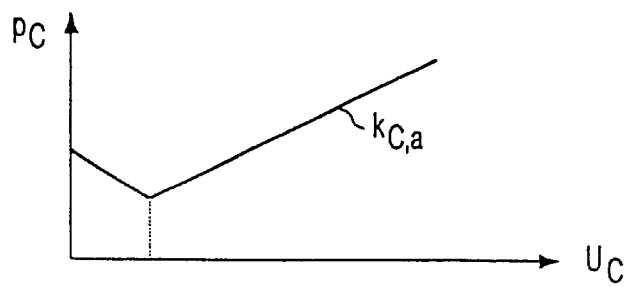
FIG. 6 shows a diagram for explaining the processing of an actual value processed by the control circuit.

FIG. 5 shows the way of operation of a further variant of embodiment of the control circuit 8 with a cascaded controller structure which causes the current $i_{res}(t)$ to be limited, so that, it is avoided that a component is destroyed because of a too large value of $i_{res}(t)$, which is to be reckoned with during the starting phase of the converter 1. Just as in the variant of embodiment shown in FIG. 4, here too block 40 represents the control path which generates the actual values $U_{out}$ and $U_C$ in dependence on a correcting variable u applied to the path. The time index k has again been omitted with the time-dependent variables shown. The controller shown in FIG. 5, contrary to the controller shown in FIG. 4, includes an additional inner control loop (block 52, $k_{out,i}$, $k_{C,i}$). The correcting variable u is formed in the following fashion: First the actual value $U_{out}$ is subtracted from a predefined nominal value $U_{soll}$. The differential values thus produced are summed (block 41) and the resulting sum σ is multiplied by a factor $k_I$. A first product of the first actual value $U_{out}$ and a factor $k_{out,a}$, and a second product $P_C$ of the second actual value $U_C$ and a factor are subtracted at a summation point 51 from the resulting sum σ multiplied by $K_I$. For small values $U_C$, which occur with small loads that lead to a discontinuous resonant current $i_{res}(t)$, the factor is different from the one for large values $U_C$. FIG. 6 shows the connection between $U_C$ and $P_C$. The factor $k_{C,a}$ appears as a gradient of the function $p_C(U_C)$ In the case at hand, also for the range of a small $U_C$, a linear connection is used for simplicity (which leads to the same negative factor for all $U_C$ of this range), which has turned out to be a sufficiently accurate estimate for the basically non-linear connection. For the further range of large values $U_C$, the linear connection between $U_C$ and $p_C$ is used, as explained above. This provides a partially linear connection between $U_C$ and $p_C$. In this manner an overshoot in the converter starting phase is avoided in the case of small currents $i_{res}(t)$ or small voltages $u_C(t)$, that is, with small loads (load currents) on the converter output.

The differential value produced on the output of the summation point 51 is subjected to a limiting function (block 52), that is, the differential value is limited to a predefined limit value. This corresponds to a limitation of the value of the state $U_C$ which, it is true, is equivalent to the respective amplitude of the voltage $u_C(t)$. Since the frequency $f_{pwm} = 1/T_{pwm}$ of the pulse-width modulation is kept constant, the maximum value $U_{C,max}$, which is proportional to the limit value of the limiting function of the state $U_C$, can be directly calculated from the predefined maximum value of the current $i_{res}(t)$ by means of $$U_{C,\max} = \frac{i_{res,\max}}{2\pi f_{pwm} C}$$

provided that there is a sine-shaped current $i_{res}(t)$

From the value $u_a$ produced on the output of the block 52 is then subtracted in the inner control loop both a product $k_{out,i} U_{out}$ and a product $k_{C,i} U_C$. The differential value thus formed is the correcting variable u applied to the control path 40—as explained above—for settling the respective pulse duration $a_k$ and thus the scanning ratio of the pulse-width modulated voltage $u_{pwm}(t)$. The scanning ratio lies here in the range between zero and ½. Preferably, also the value produced by the block 41 should be limited.

For the case where the limitation of the current $i_{res}(t)$ by the inner control loop is not active, the inner and outer control loops of the controller structure shown in FIG. 5 can be combined, which leads to a simpler controller structure such as in FIG. 4. The connection between the parameters $k_{out,a}$, $k_{out,i}$, $k_{C,a}$, $k_{C,i}$ and the parameters of the simplified controller structure $k_{out}$ and $k_C$ is then expressed by $$k_{out,a} = k_{out} - k_{out,i}$$

$$k_{C,a} = k_C - k_{C,i}$$

What is claimed is:

1. A series resonant converter comprising a digital control circuit for controlling the output voltage of the converter, wherein said digital control circuit is provided with:
   1) means for processing a first actual value ($U_{out}$), which depends on the respective converter output voltage ($u_{out}(t)$),
   2) means for processing a second actual value ($U_C$), which depends on the respective current flowing through the series resonant circuit elements (C, L, R), of the converter, and
   3) means for delivering a correcting variable (u) determining the scanning ratio of a pulse-width modulated voltage ($U_{upm}(t)$) delivered to the series resonant circuit of the converter.

2. A converter as claimed in claim 1, digital control circuit includes a state space controller.

3. A converter as claimed in claim 2, wherein said second actual value ($U_C$) represents scanning values of the current ($i_{res}(t)$) at its peaks flowing through the series resonant circuit elements (C, L, R).

4. A converter as claimed in claim 3, further comprising integration means provided for integrating the current ($i_{res}$(t)) flowing through the series resonant circuit elements (C, L, R) of the converter to form the scanning values used for forming the second actual value ($U_C$).

5. A converter as claimed in one of the claim 1, further comprising means for forming the correcting variable (u) by subtracting both 1) a first product of a factor and the first actual value, and 2) a second product of a second factor and the second actual value from a value derived from the difference between the first actual value and a nominal value that represents the DC output voltage to be delivered.

6. A converter as claimed in claim 1, further comprising a cascaded controller structure for controlling the formation of the correcting value (u).

7. A converter as claimed in claim 6, wherein said cascaded controller structure further includes a) an outer control loop for forming the correcting variable (u), said outer control loop subtracting both 1) a first product of a factor and the first actual value and 2) a second product of a second factor and the second actual value from a value derived from the difference between the first actual value and a nominal value that represents the DC output voltage to be delivered, and b) an inner control loop for subtracting, after the difference value produced by the outer control loop has been processed according to a limiting function, both 1) a third product of a third factor and the first actual value, and 2) a fourth product of a fourth factor and the second actual value from the value processed according to the limiting function.

8. A converter as claimed in claim 7, wherein if a small load is present on the converter output, the second actual value ($U_C$) is converted in the outer control loop according to a non-linear function into a value ($P_C$) that is used instead of the second product.

9. A converter as claimed in claim 8, wherein the non-linear function is partially linear.

10. A converter as claimed in claim 5, wherein the difference of the first actual value ($U_{out}$) and a nominal value ($U_{soll}$) representing the DC output voltage to be delivered is summed while the sum values ($\sigma$) thus formed are weighted with a further factor ($k_I$).

* * * * *